United States Patent [19]

Todoh

[11] Patent Number: 4,546,364

[45] Date of Patent: Oct. 8, 1985

[54] HEAD FOR ELECTROSTATIC RECORDING

[75] Inventor: Hidemasa Todoh, Kanagawa, Japan

[73] Assignee: Fuji Xerox Co., Ltd., Tokyo, Japan

[21] Appl. No.: 545,975

[22] Filed: Oct. 27, 1983

[30] Foreign Application Priority Data

Oct. 29, 1982 [JP] Japan .................................. 57-190467
Oct. 29, 1982 [JP] Japan .................................. 57-190468
Oct. 29, 1982 [JP] Japan .................................. 57-190470

[51] Int. Cl.⁴ .......................................... G01D 15/06
[52] U.S. Cl. .................................................. 346/155
[58] Field of Search ................. 346/155, 139 C, 153.1

[56] References Cited

U.S. PATENT DOCUMENTS

| | | | |
|---|---|---|---|
| 3,761,954 | 9/1973 | Hansen et al. | 346/139 C |
| 4,189,736 | 2/1980 | DeFilipps | 346/155 X |
| 4,233,611 | 11/1980 | Nakano et al. | 346/153.1 X |
| 4,400,709 | 8/1983 | de Kermadec et al. | 346/155 X |
| 4,476,473 | 10/1984 | Wako | 346/155 |

*Primary Examiner*—Thomas H. Tarcza

*Attorney, Agent, or Firm*—Sughrue, Mion, Zinn, Macpeak and Seas

[57] ABSTRACT

An electrostatic recording head with an array of stylus electrodes each of which is provided with a voltage responsive to recording information for scanning video signals by lines in a horizontal direction. The head comprises a thin metal or plastic sheet having predetermined size and thickness. An insulating layer of a predetermined thickness is formed on one side of the thin metal sheet if used as the base material. Lead electrodes are fixed at a given interval on the plastic or the insulating layer and are connected at one end to a drive circuit. Recording electrodes are provided at the other end of said lead electrodes. An insulating layer covers the lead electrodes. Electrostatic recording is effected on a recording element that has been given charges of a polarity opposite to that of the voltage applied in response to the recording information. A control electrode may be employed to eliminate the need for a corona discharge device.

18 Claims, 8 Drawing Figures

HEAD FOR ELECTROSTATIC RECORDING

BACKGROUND OF THE INVENTION

The present invention relates to a head for electrostatic recording that can be used with hard recording materials because it comprises principal electrodes or a combination of principal electrodes and a control electrode formed on a thin metal plate.

One conventional head for electrostatic recording uses an array of stylus electrodes comprising a number of insulated wires (e.g., 8 lines/mm) embedded in an epoxy resin. The tip of this head is brought into close contact with the surface of a moving sheet of insulating recording paper, and a voltage responsive to the input information is distributed among the wires through a distributor circuit so as to provide a latent electrostatic image on the recording paper in response to the applied voltage. The latent image is developed with toner particles to provide a visible image. One defect with such a conventional head for electrostatic recording is its applicability is limited to soft recording materials (e.g., paper and film) because the wires are hard styli embedded in an epoxy resin.

SUMMARY OF THE INVENTION

Therefore, one object of the present invention is to provide a head for electrostatic recording that has principal electrodes formed on a thin metal plate and can be used with hard recording materials.

Another object of the present invention is to provide a head for electrostatic recording that has both principal electrodes and a control electrode formed on a thin metal plate so that the head can be used with a hard recording material on a metal drum without requiring a corona discharge device such as a corotron for providing an electrostatic latent image.

A further object of the present invention is to provide a head for electrostatic recording that has both principal electrodes and a control electrode formed on a plastic film so that the head can be used with a hard recording material on a metal drum without requiring a corona discharge device such as a corotron for providing an electrostatic latent image.

DETAILED DESCRIPTION OF THE INVENTION

Figure 1:
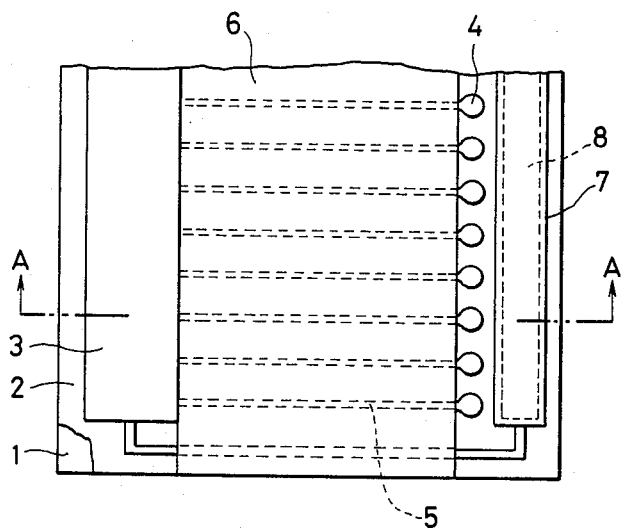
FIG. 1 is a plan view common to three embodiments of the head of the present invention.
Figure 2A:
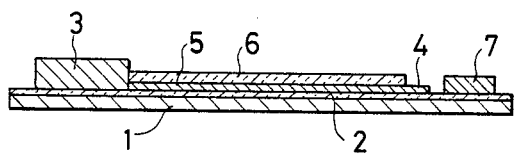
FIGS. 2A to 2C are cross sections of the three embodiments when taken on line A—A in FIG. 1.

FIG. 1 and FIG. 2A show a first preferred embodiment of the head of the present invention. It comprises; a base 1 made of a thin plate of metal such as phosphor bronze and having a predetermined size, an insulating layer 2 made of a polyimide resin or the like that is formed on the entire area of one surface of the metal base 1, a driving integrated circuit (IC) 3 that is fixed on the insulating layer 2 and which supplies each stylus with a voltage responsive to the input information, lead electrodes 5 connected to the IC 3 that are arranged at a predetermined interval and each of which has a predetermined length fixed to the insulating layer 2 by photoetching or plating, recording electrodes 4 disposed in a row at one end of said lead electrodes 5, an insulating layer 6 that covers the entire area of the lead electrodes 5 except for the recording electrodes 4, and an insulating layer 7 placed adjacent and parallel to the recording electrodes 4. The metal base 1 is made of a thin film (ca. 80 $\mu$m) of a highly flexible material such as phosphor bronze. The insulating layer 2 is made of a film as thin as 20 $\mu$m. The recording electrodes 4 are arranged in a density of 16 dots/mm and measure about 40 $\mu$m in diameter and 3 $\mu$m in thickness. The lead electrodes 5 as well as the recording electrodes 4 are about 30 $\mu$m wide and 3 $\mu$m thick. They are produced by the photoetching technique comprising vapor-depositing a nickel layer on the entire area of the insulating layer 2, coating the layer with a photoresist, exposing the layer to UV radiation through a photo mask, removing the photoresist, and etching the nickel layer in the unexposed area.

Figure 3A:
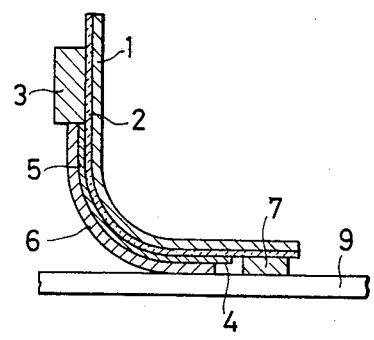
FIGS. 3A and 3B are cross sections showing how the heads according to the first and second embodiments of the present invention are deformed during the recording operation.
Figure 3B:
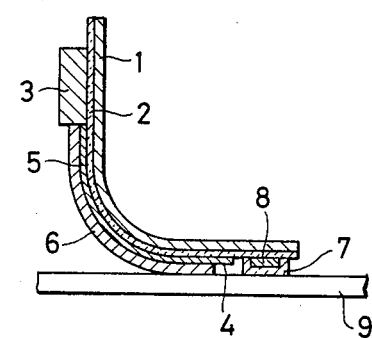

The tip of the head (i.e., the part of the insulating layer 6 adjacent the recording electrodes 4 and the entire area of the insulating layer 7) is pressed against a hard recording element 9 as shown in FIG. 3. Because of its resiliency, the metal base 1 functions as a leaf spring, causing the stylus to be pressed onto the recording element with the proper force and permitting recording on that hard recording element without damaging it or the stylus.

Figure 4:
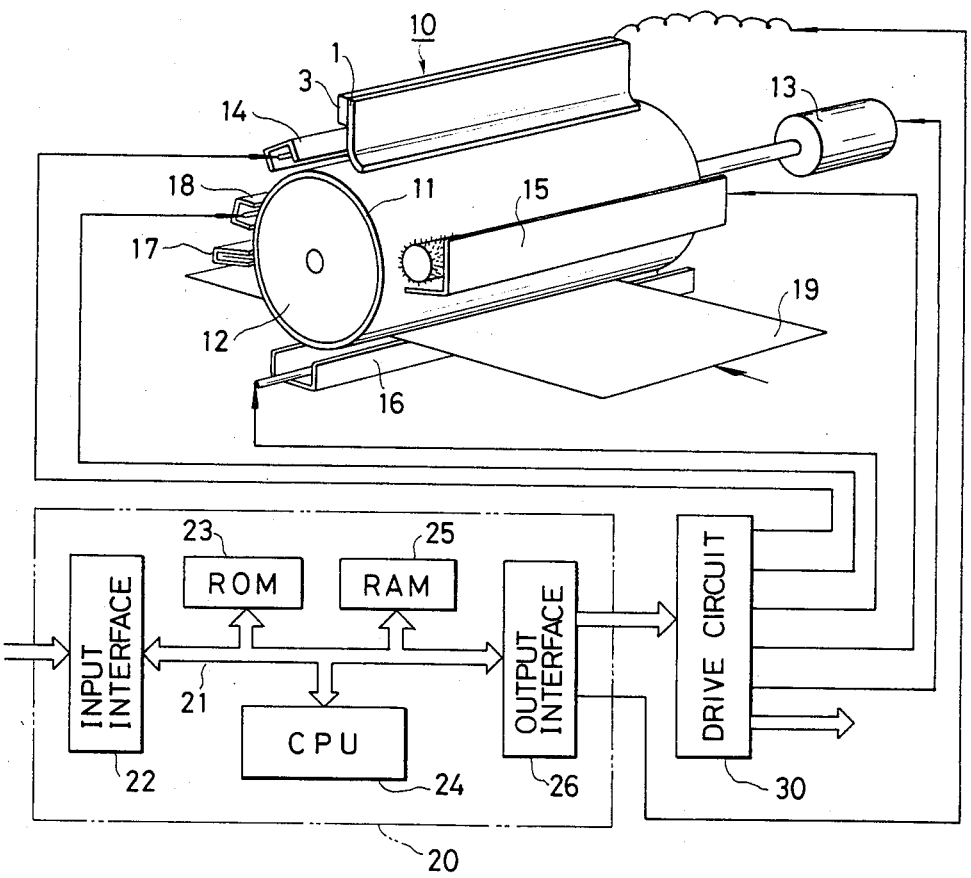
FIG. 4 is a schematic diagram showing the recording apparatus employing the head of the present invention.

FIG. 4 illustrates a recording apparatus using the head of the first embodiment of the present invention. The apparatus which is generally indicated at 10 comprises a drum 12 with a recording element 11 formed of an aluminum cylinder having a resistive layer (carbon+binder, 20 $\mu$m thick) overlaid with a dielectric layer of polyester resin (5 $\mu$m thick); a motor 13 for driving the drum 12; a corona discharge device 14 (typically a corotron) for imparting static charges on the recording element 11; a developer 15 that deposits a two-component toner powder on the recording element 11 in response to the surface charges; a corotron 16 for transferring the toner particles onto a sheet of plain paper 19; a cleaner 17 for removing any residual toner particles from the drum surface; and a corotron 18 for erasing the electrical charges from the cleaned recording element 11.

The apparatus comprising these elements, as well as the recording head 10 are driven by a drive circuit 30 that is controlled by a control unit 20. The control unit 20 comprises an input interface 22 that receives a recording signal, as well as the output from keys on the console, sensors and switches, and converts them into digital signals which are fed to a bus line 21. A read-only memory (ROM) 23 stores a program for driving the recording mechanism according a predetermined sequence and for distributing a voltage among the styli (recording electrodes 4) on the head 10 in response to the recording signal. A central processing unit (CPU) 24 sends commands for performing predetermined arithmetic operations, decisions and controls according to the program stored in the ROM 23. A random access memory (RAM) 25 storing temporarily the input information and the results of operations by the CPU 24. An output interface 26 sends the control command from the CPU 24 to an external unit.

Figure 5:
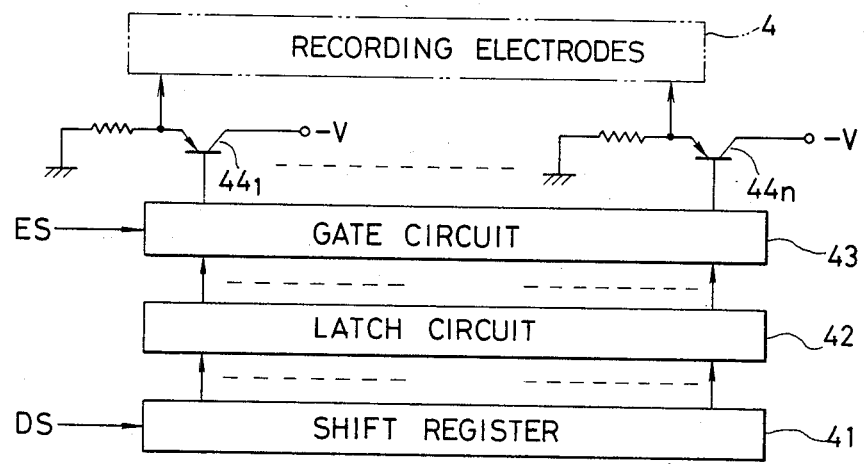
FIG. 5 is a circuit diagram showing details of the integrated circuit that can be used to drive the recording head of the present invention.

The integrated circuit 3 of FIG. 2A distributes a voltage among the styli on the head 10 according to the input information. As shown in FIG. 5, this circuit comprises a shift register 41 for storing one line of digital video signals DS from the control unit 20. A latch circuit 42 is employed for latching the content of the register 41. A gate circuit 43 sends the latched signal responsive to an ENABLE signal ES coming from the control unit 20. High-voltage drive transistors $44_1$ to $44_n$ are coupled to the respective recording electrodes 4 in a one-to-one relationship. The transsistors $44_1$ to $44_n$ are fabricated in either a bipolar or V-MOS configuration and the other devices of the integrated circuit 3 are manufactured in a CMOS configuration. A chip of the integrated circuit 3 consists of 64 bits and is supported on a ceramic base.

The apparatus of FIG. 4 is operated as follows. The corotron 14 charges the surface of the recording element 11 on the rotating drum 12 to a positive voltage of 400 volts, and the voltage is distributed among the styli on the head 10 by one line of video signals DS and ENABLE signals ES from the control unit 20 (in the form of pulses having a pulse width of about 20 $\mu$s at the voltage applied to each stylus, say, $-300$ volts). The resulting latent electrostatic image is developed with toner particles in the developer 15 to provide a visible image, which is transferred to the sheet of plain paper 19 under high voltage (e.g., $-5$ kV) supplied from the transfer corotron 16. The supply of the sheet of plain paper 19 is timed to the rotation of the drum 12 and, after receiving the visible image, the sheet is discharged out of the recording apparatus. The drum 12 is cleaned by the cleaner 17 and any residual static charges are erased from the recording element 11 by the corotron 18 which typically operates from an a.c. source.

As will be understood from the above description, the head according to the first embodiment of the present invention has principal electrodes formed on a thin metal plate and can be used for electrostatic recording on a hard material such as a drum of metal base.

Figure 2B:
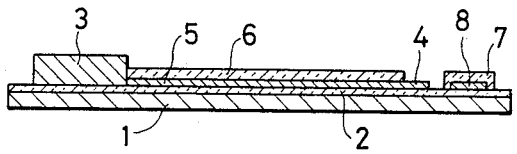

A second embodiment of the present invention is hereunder described by reference to FIG. 2B, wherein the numerals the same as those used in FIG. 2A identify the same elements. The second embodiment of the present invention relates to a head for electrostatic recording having both principal electrodes and a control electrode formed on a thin metal plate. More specifically, the head according to the second embodiment includes a control electrode 8 which is formed parallel to the row of recording electrodes 4 and connected to the drive circuit 3. The control electrode 8 is covered with the insulating layer 7.

The control electrode 8, as well as lead electrodes 5 and recording electrodes 4 are produced by the photoetching technique comprising vapor-depositing a nickel layer on the entire area of the insulating layer 2, coating the layer with a photoresist, exposing the layer to UV radiation through a photo mask, removing the resist and etching the nickel layer in the unexposed area. The lead electrodes and recording electrodes are approximately 30 $\mu$m wide and 3 $\mu$m thick, whereas the control electrode measures about 6 mm wide and is somewhat longer than the width of the sheet of plain paper 19. The control electrode 8 eliminates the need of charging the recording element for making an electrostatic latent image, and hence, the recording apparatus of FIG. 4 does not have to use the charging corotron 14. The control electrode may be divided into subsections for scanning purposes, and this has the advantage of simplifying the drive circuit for the styli on the head 10.

The second embodiment of the present invention utilizes the same recording apparatus of the first embodiment but omits the charging corotron 14. Referring again to FIG. 4, the drum 12 from which the surface charges have been erased by the corotron 18 rotates at a peripheral speed controlled by the control unit 20, and electrostatic recording is performed under the head 10. The head 10 receives a d.c. voltage (e.g., $+400$ V) at the control electrode 8, and the voltage is distributed among the styli (recording electrodes 4) on the head by one line of video signals DS and ENABLE signals ES from the control unit 20 (in the form of pulses having a pulse width of 100 $\mu$s at $-300$ V), thereby forming an electrostatic latent image on the recording element 11.

As will be understood from the above description, the head according to the second embodiment of the present invention has both principal electrodes and a control electrode formed on a thin metal plate, so the head can be used for electrostatic recording on a hard material such as a drum of metal base. Another advantage of using the control electrode is that a recording apparatus without a charge corotron can be fabricated.

Figure 2C:
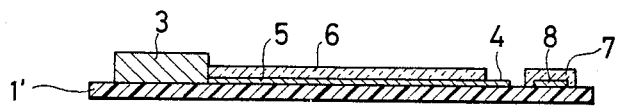

A third embodiment of the present invention is described by reference to FIG. 2C, wherein the same numerals as those used in FIG. 2A identify the same elements. The third embodiment of the present invention relates to a head that has both principal electrodes and a control electrode formed on a plastic film and which can be used for electrostatic recording on a hard material. It comprises a base 1' made of a plastic film such as a ployimide film having predetermined dimensions; a driving integrated circuit 3 that is fixed to the base film 1' and which applies each stylus with a voltage responsive to the input information; lead electrodes 5 connected to the integrated circuit 3 that are arranged at a predetermined interval and each of which has a predetermined length fixed to the base film 1' by photoetching or plating; recording electrodes 4 disposed in a row at one end of said lead electrodes 5; an insulating layer 6 that covers the entire area of the lead electrodes 5 except for the recording electrodes 4; a control electrode 8 which is formed parallel to the row of recording electrodes 4 and connected to the drive circuit 3; and an insulating layer 7 that covers the control electrode 8. The base film 1' is made of a thin film (200 $\mu$m) of a plastic material such as polyimide. The recording electrodes 4 are arranged at a density of 16 dots/mm and measure about 40 $\mu$m in diameter and 3 $\mu$m in thickness.

The control electrodes 8, as well as the lead electrodes 5 and recording electrodes 4 are produced by the photoetching technique comprising vapor-depositing a nickel layer on the entire area of the base film 1', coating the layer with a photoresist, exposing the layer to UV radiation through a photo mask, removing the resist, and etching the nickel layer in the unexposed area. The lead electrodes and recording electrodes are about 30 $\mu$m wide and 3 $\mu$m thick, whereas the control electrode measures about 6 mm wide and is somewhat longer than the width of the sheet of plain paper 19. Like the metal base 1 used in the first and second embodiments, the base film 1' functions as if it were a leaf spring.

As in the second embodiment, the control electrode 8 eliminates the need of charging the recording element for making an electrostatic latent image, and hence, the recording apparatus does not have to use the charging corotron 14. Again, the control electrode may be divided into subsections for scanning purposes, and this has the advantage of simplifying the drive circuit for the styli on the head 10.

As described in the foregoing description, the head according to the third embodiment of the present invention has both principal electrodes and a control electrode formed on a plastic film, so the head can be used for electrostatic recording on a hard material such as a drum of metal base. Another advantage of using the control electrode is that a recording apparatus without a charge corotron can be fabricated. If this corotron used as a corona discharge device for making an electrostatic latent image is used, no control electrode need be formed on the recording head, as in the first embodiment.

A recording head, according to the second embodiment of the present invention, was prepared and set up in an electrostatic recording apparatus of the type shown in FIG. 4, but without the corotron 14. After making 100,000 copies of B4 size, no appreciable wear was detected in the styli and the recording element around the drum. This demonstrated the practical applicability of the head of the present invention.

It is apparent that modification of the invention may be practical without departing from the scope of the invention.

I claim:

1. An electrostatic recording head having an array of stylus electrodes each of which is provided with a voltage responsive to recording information for scanning signals by lines in a horizontal direction, said head comprising; a thin metal sheet substrate having a predetermined size and thickness to function as a spring, a first insulating layer of a predetermined thickness formed on one side of the thin metal sheet, lead electrodes fixed at a given interval on the first insulating layer and connected at one end to a drive circuit mounted on said fist insulating layer, recording electrodes provided at the other end of said lead electrodes, and a second insulating layer disposed over said lead electrodes, wherein electrostatic recording being effected on a recording element that has been given charges of a polarity opposite to that of the voltage applied in response to the recording information.

2. The electrostatic recording head of claim 1 further comprising at least one control electrode connected to said drive circuit, and mounted on said first insulating layer, and said second insulating layer covering said control electrode.

3. The electrostatic recording head of claim 2 wherein said control electrode is formed parallel to the recording electrodes.

4. The electrostatic recording head of claim 2 wherein said lead electrodes and said control electrodes are approximately 30 μm wide and 3 μm thick and said control electrode is approximately 6 μm wide.

5. The electrostatic recording head of claim 1 wherein said thin metal sheet is phosphor bronze having a thickness in the range of 80 μm.

6. The electrostatic recording head of claim 2 wherein said thin metal sheet is phosphor bronze having a thickness in the range of 80 μm.

7. The electrostatic recording head of claim 1 wherein said first and second insulating layers are a polyimide resin and said first insulating layer is formed to a thickness at least 20 μm.

8. The electrostatic recording head of claim 1 wherein said recording electrodes are arranged in a density of 16 dots/mm and are approximately 40 μm in diameter having a thickness of 3 μm.

9. The electrostatic recording head of claim 2 wherein said recording electrodes are arranged in a density of 16 dots/mm and are approximately 40 μm in diameter having a thickness of 3 μm.

10. The electrostatic recording head of claim 1 wherein said drive circuit comprises a shift register for storing one line of input signals, a latch circuit for latching the contents of said shift register, a gate circuit for sending the latched signal to said recording electrodes in response to an enable signal and drive transistors for coupling respective recording electrodes to said gate circuit.

11. An electrostatic recording head having an array of stylus electrodes each of which is provided with a voltage responsive to recording information for scanning signals by lines in a horizontal direction, said head comprising a plastic film substrate having a predetermined size and sufficient elasticity to bend itself; lead electrodes fixed at a given interval on the plastic film and connected at one end to a drive circuit mounted on said plastic film substrate; recording electrodes provided at the other end of said lead electrodes, at least one control electrode connected to said drive circuit and mounted on said plastic film substrate, and an insulating layer for covering said control electrode and said lead electrodes.

12. The electrostatic recording head of claim 11 wherein said drive circuit comprises a shift register for storing one line of input signals, a latch circuit for latching the contents of said shift register, a gate circuit for sending the latched signal to said recording electrodes in response to an enable signal and drive transistors coupling to respective recording electrodes to said gate circuit.

13. The electrostatic recording head of claim 11 wherein said control electrode is formed parallel to the recording electrodes.

14. The electrostatic recording head of claim 11 wherein said lead electrodes and said control electrodes are approximately 30 μm wide and 3 μm thick and said control electrode is approximately 6 μm wide.

15. The electrostatic recording head of claim 11 wherein said recording electrodes are arranged in a density of 16 dots/mm and are approximately 40 μm in diameter having a thickness of 3 μm.

16. The electrostatic recording head of claim 11 wherein said recording electrodes are arranged in a desnsity of 16 dots/mm and are approximately 40 μm in diameter having a thickness of 3 μm.

17. The electrostatic recording head of claim 11 wherein said drive circuit comprises a shift register for storing one line of input signals, a latch circuit for latching the contents of said shift register, a gate circuit for sending the latched signal to said recording electrodes in response to an enable signal and drive transistors coupling to respective recording electrodes to said gate circuit.

18. The electrostatic recording head of claim 11 wherein said plastic film is a polyimide resin having thickness of approximately 200 μm.

* * * * *